US012020069B2

(12) United States Patent
Raz et al.

(10) Patent No.: US 12,020,069 B2
(45) Date of Patent: Jun. 25, 2024

(54) MEMORY MANAGEMENT IN A MULTI-PROCESSOR ENVIRONMENT

(71) Applicant: Next Silicon Ltd, Givatayim (IL)

(72) Inventors: Elad Raz, Ramat Gan (IL); Ilan Tayari, Tzur Hadassa (IL); Dan Shechter, Tel Aviv (IL); Yuval Asher Deutsher, Givatayim (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 17/885,642

(22) Filed: Aug. 11, 2022

(65) Prior Publication Data

US 2024/0054015 A1    Feb. 15, 2024

(51) Int. Cl.
*G06F 12/00* (2006.01)
*G06F 9/50* (2006.01)
*G06F 12/02* (2006.01)

(52) U.S. Cl.
CPC .......... *G06F 9/5016* (2013.01); *G06F 9/5022* (2013.01); *G06F 12/023* (2013.01); *G06F 2209/5011* (2013.01)

(58) Field of Classification Search
CPC .... G06F 9/5016; G06F 9/5022; G06F 12/023; G06F 2209/5011
See application file for complete search history.

(56) References Cited

U.S. PATENT DOCUMENTS

| 9,898,197 B1 * | 2/2018 | Gao ................ G06F 3/067 |
| 2018/0150417 A1 | 5/2018 | Kubala et al. |
| 2019/0155762 A1 * | 5/2019 | Kubala .............. G06F 5/065 |

FOREIGN PATENT DOCUMENTS

| CN | 110858162 B * | 9/2022 | ......... G06F 12/0246 |
| WO | WO-2017142525 A1 * | 8/2017 | |
| WO | WO 2021/003002 | 1/2021 | |

OTHER PUBLICATIONS

English language translation of CN110858162 (Year: 2022).*
Supplementary European Search Report and the European Search Opinion dated Jan. 15, 2024 From the European Patent Office Re. Application No. 23190112.5. (9 Pages).

* cited by examiner

*Primary Examiner* — John A Lane (57) ABSTRACT

There is provided a computer implemented method of allocation of memory, comprising: issuing an allocation operation for allocation of a region of a pool of a memory by a first process executed on a first processor, sending a message to a second processor indicating the allocation of the region of the pool of the memory, wherein the first processor and the second processor access the region of the pool of the memory, issuing a free operation for release of the allocated region of the pool of the memory by a second process executed on a second processor, and releasing, by the first processor, the allocated region of the pool of the memory as indicated in the free operation, wherein the region of the pool of the memory allocated by the first process and released by the second process is a same region of memory.

24 Claims, 5 Drawing Sheets

MEMORY MANAGEMENT IN A MULTI-PROCESSOR ENVIRONMENT

RELATED APPLICATION

This application is related to, and being co-filed with, U.S. patent application Ser. No. 17/885,654, entitled "HARDWARE-ACCELERATED MEMORY ALLOCATION", by at least one common Inventor as Inventors of the instant application, and incorporated herein by reference in its entirety.

BACKGROUND

The present invention, in some embodiments thereof, relates to memory management and, more specifically, but not exclusively, to memory management in a multi-processor environment.

Many computing systems include multiple processors, for example, for parallel processing, offloading complex computations to specialized hardware, and for data transfer. In such systems, each processor has its own memory allocator and its own memory, and performs its own memory management independently of other processors.

SUMMARY

According to a first aspect, a computer implemented method of allocation of memory, comprises: issuing an allocation operation for allocation of a region of a pool of a memory by a first process executed on a first processor, sending a message to a second processor indicating the allocation of the region of the pool of the memory, wherein the first processor and the second processor access the region of the pool of the memory, issuing a free operation for release of the allocated region of the pool of the memory by a second process executed on a second processor, and releasing, by the first processor, the allocated region of the pool of the memory as indicated in the free operation, wherein the region of the pool of the memory allocated by the first process executed on the first processor and released by the second process executed on the second processor is a same region of memory.

In a further implementation form of the first aspect, the first processor and the second processor are of a plurality of heterogeneous processors, wherein the first processor is of a first type of architecture and the second processor is of a second type of architecture that is different from the first type of architecture type of the first processor.

In a further implementation form of the first aspect, one of: (i) wherein the first type of architecture comprises a data-flow processing architecture, and the second type of architecture comprises a non-data-flow processing architecture, and (ii) wherein the first type of architecture comprises a non-data-flow processing architecture, and the second type of architecture comprises a data-flow processing architecture.

In a further implementation form of the first aspect, a message is sent to the first processor from the second processor for triggering the releasing by the first processor.

In a further implementation form of the first aspect, issuing the free operation for release of the allocated region of the memory comprises: marking, by the second processor, a garbage-collection data structure with an indication of the allocated region of the pool of the memory as indicated in the free operation, and removing, by the first processor, the allocated region of the pool of the memory as indicated by the marking on the garbage-collection data structure.

In a further implementation form of the first aspect, further comprising: updating by the first processor a first state data structure for indicating the allocation, updating by the second processor a second state data structure for indicating the release, wherein the first state data structure is different from the second state data structure, wherein the first state data structure is non-accessible by the second processor and the second state data structure is non-accessible by the first processor, and in response to the free operation, sending a message to the first processor for updating the first state data structure for indicating the release.

In a further implementation form of the first aspect, at least one of (i) the allocation of the region of the memory, (ii) deallocation of the region of memory, and (iii) the release of the allocation of the region of the memory, is performed in a single atomic operation.

In a further implementation form of the first aspect, the single atomic operation comprises: reading a state data structure indicating a state of allocation of the pool, checking the state data structure for a condition, updating the state data structure according to an outcome of the check, and returning an address of the allocated region of the memory in response to a request for allocation of the memory.

In a further implementation form of the first aspect, the first process that generates the allocation operation and the second process that generates the free operation are a plurality of different instances of a same set of code.

In a further implementation form of the first aspect, a single instance of the plurality of different instances is executed at any given time, wherein the first process comprises a first instance of the code executed by the first processor that generates the allocation operation and the second process comprises a second instance of the code executed by the second processor that generates the free operation.

In a further implementation form of the first aspect, further comprising migrating the allocated memory from the first processor to the second processor, wherein the free operation generated by the second process is for release of the migrated allocated memory.

In a further implementation form of the first aspect, further comprising: a third processor that uses the allocated region of memory allocated by the first processor.

In a further implementation form of the first aspect, the third processor is of a third type of architecture that is different from a second type of architecture of the second processor and different from a first type of architecture of the first processor.

In a further implementation form of the first aspect, the first processor further comprises a first memory allocator and the second processor further comprises a second memory allocator, and further comprising: a code that maps a first pool of the memory for use by the first processor and a second pool of the memory for use by the second processor, and for allocation by the first memory allocator and the second memory allocator, in distinct memory locations.

In a further implementation form of the first aspect, the first memory allocator is of a different type than the second memory allocator, and further comprising a code that in response to the free operation issued by the second memory allocator, instructs the first memory allocator to release the memory indicated by the free operation.

In a further implementation form of the first aspect, the code instructs the first memory allocator to release the memory according to a memory address of the released memory, marks the released memory for deletion on a first memory pool of the first processor and maps the released memory for deletion on the second pool of the second processor.

In a further implementation form of the first aspect, the released memory is marked for deletion by a queue associated with the first allocator that allocated the released memory.

In a further implementation form of the first aspect, the second processor executes a garbage collection code for monitoring for released memory marked for deletion, and frees the released memory.

In a further implementation form of the first aspect, the code generates a message for sending to the second processor, the message indicating the mapping of the released memory for deletion on the first memory pool to the second pool of the second processor.

In a further implementation form of the first aspect, the message is sent asynchronously, wherein no completion message is triggered in response to the message, wherein operations follow the free operation are non-blocked by the message.

According to a second aspect, a computer implemented method of allocation of memory, comprises: issuing an allocation operation for allocation of a region of a pool of a memory by a first process executed on a first processor, sending a message to a second processor indicating the allocation of the region of the pool of the memory, issuing a free operation for release of the allocated region of the pool of the memory by a second process executed on a second processor, wherein the first processor and second processor access the same memory, converting format of a code segment that deallocates memory, from a format of the first processor to a format of the second processor, and running the converted code segment by the second processor for releasing the region of the pool of the memory allocated by the first processor as indicated in the free operation.

In a further implementation form of the second aspect, converting format comprises translating the code segment, wherein the code segment is translated when an architecture type of the first processor is different from an architecture type of a second processor.

In a further implementation form of the second aspect, the second processor running the converted code segment accesses a state data structure managed by the first processor for updating the state data structure to indicate the release of the allocated region of the pool of the memory.

According to a third aspect, a computer implemented method of allocation of memory, comprises: issuing an allocation operation for allocation of a region of a pool of a memory by a first process executed on a first processor, sending a message to a second processor indicating the allocation of the region of the pool of the memory, wherein the first processor and the second processor access the region of the pool of the memory, issuing a free operation for release of the allocated region of the pool of the memory by a second process executed on a second processor, marking, by the second processor, a garbage-collection data structure with an indication of the allocated region of the pool of the memory as indicated in the free operation, and removing, by the first processor, the allocated region of the pool of the memory as indicated by the marking on the garbage-collection data structure.

According to a fourth aspect, A computer implemented method of allocation of memory, comprises: issuing an allocation operation for allocation of a region of a pool of a memory by a first process executed on a first processor, updating by the first processor, a state data structure for indicating the allocation, sending a message to a second processor indicating the allocation of the region of the pool of the memory, wherein the first processor and the second processor access the region of the pool of the memory, issuing a free operation for release of the allocated region of the pool of the memory by a second process executed on a second processor, releasing the allocated region of the pool of the memory by the second processor according to the free operation, and updating by the second processor, the state data structure for indicating the release, wherein the same state structure is accessible and updated by the first processor and the second processor, wherein the region of the pool of the memory allocated by the first process executed on the first processor and released by the second process executed on the second processor is a same region of memory.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to memory management and, more specifically, but not exclusively, to memory management in a multi-processor environment.

An aspect of some embodiments of the present invention relates to systems, methods, computing devices, processors, circuitry, and/or code instructions (stored on a data storage device and executable by one or more processors) for allocation of memory, release of the memory, and/or use of the memory, by multiple processors, optionally heterogeneous processors of different architectural types. A first process executed on a first processor issues an allocation operation for allocation of a region of a pool of a memory. A message is sent to a second processor indicating the allocation of the region of the pool of the memory. The first processor and the second processor access the same region of the pool of the memory. A second process executed on a second processor issues a free operation for release of the allocated region of the pool of the memory. The region of the pool of the memory allocated based on the request issued by the first process executed on the first processor and released based on the request issued by the second process executed on the second processor is the same region of memory. Multiple embodiments relate to the release of the region of the pool of the memory:

In some embodiments, the first processor releases the allocated region of the pool of the memory as indicated in the free operation. For example, the second processor sends a message to the first processor instructing the release.

In some embodiments, a format of a code segment that deallocates memory is converted, from a format of the first processor to a format of the second processor. The second processor executes the converted code segment for releasing the region of the pool of the memory allocated by the first processor as indicated in the free operation.

In some embodiments, the second processor marks a garbage-collection data structure with an indication of the allocated region of the pool of the memory as indicated in the free operation. The first processor removes the allocated region of the pool of the memory as indicated by the marking on the garbage-collection data structure, thereby freeing the allocated region of the memory.

In some embodiments, the first processor updates a state data structure for indicating the allocation. The second processor updates the same state data structure for indicating the release.

At least some embodiments described herein address the technical problem of improving performance of memory management (i.e., allocation and release of memory) in a multi-processor environment, optionally in a heterogeneous processing environment.

Memory allocation in general deals with the problem of dividing large chunks of memory to smaller chunks, and handing them to applications according to application-dictated lifetime rules that are usually not known to the memory allocator a priori.

An application may request (e.g., allocate) chunks of memory of arbitrary sizes, and release (e.g., free) previously allocated chunks at arbitrary times. A memory allocator observes those events in chronological order, and must process them in real-time. Malloc requests must be satisfied by replying with a memory chunk of at least the requested size which is not overlapping with any other already allocated memory chunk, while free requests require no reply, and serve to notify the memory allocator that the specific chunk can now be re-used or otherwise manipulated.

Traditionally, an allocation operation and a free operation are required to execute on the same processing circuit, thus limiting performance of applications that make use of many such operations on a heterogeneous platform. In heterogeneous processing systems each processor has a different allocator designed for its specific architecture. Since memory is traditionally released by the same allocator that allocated it, memory cannot be simply released by code executing on a different architecture, since the code of one allocator of one processor architecture type cannot simply be run on another processor of another architecture type (without converting the code as described herein).

At least some embodiments described herein relate to a system of multiple processors of different architectures (i.e., a heterogeneous execution system), with a memory subsystem that is capable of allocating memory on one processor architecture, and using the allocated memory for the execution of an application on any of the architectures, and freeing it on any of the processor architectures. For example, memory is allocated on the data-flow processor and freed on the general-purpose processor.

Although embodiments described herein may also be applied to a homogenous processing environment, where all processors are of a same architecture type, other existing approaches may be used for the homogenous processing environment. In contrast, no suitable approaches exist for the heterogenous processing environment. It is noted that at least some embodiments described herein which may be used for the heterogeneous and/or homogenous processing environment are different from existing approaches designed for the homogenous processing environment.

At least some embodiments described herein improve the technology of memory management (i.e., allocation and release of memory) in a multi-processor environment, optionally in a heterogeneous processing environment. In existing/standard multi-processor environments, memory management is performed on the same processor on which the code is executed, i.e., each processor performs its own allocation of memory and its own freeing of the allocated memory. In other existing/standard multi-processor environments, a main processor performs the allocation and deallocation of memory for all processors, even when the memory is used by another processor.

In at least some embodiments, the solution to the technical problem and/or the improvement to the technology, is in terms of improved performance, such as reduced processing time, reduced access time, and/or reduced processor utilization, which is obtained by enabling different processors, optionally heterogeneous processors, to allocate, use, and/or free the same region in memory.

In at least some embodiments, code may begin execution on one processor (e.g., of one architecture) and end execution on another processor (e.g., of another architecture). Memory management operations for the code (e.g., allocate, free) may be performed using different memory allocators for each processor (e.g., each architecture) depending on which process the code is executing on.

In at least some embodiments, enabling different processors to allocate, use, and release the same region of memory, supports execution architectures and/or fluid memory management models where code and/or memory flow in and out of different processors.

Examples of improvement in performance obtained by embodiments described herein that enable different processors to allocate, use, and release the same region of memory are now described. In a first example, an application whose execution was redirected to an accelerator card requires memory allocation. Instead of returning execution to the primary processor (as done in standard/existing approaches), memory is allocated on the accelerator's architecture natively, thus improving performance. In a second example, an application always allocates memory for data on code running in one processor architecture, but uses the memory and deallocates the memory in code running on a different processor architecture. Instead of waiting for the first architecture to perform and acknowledge the deallocation (as done in standard/existing approaches), the second processor may resume execution immediately, thus improving performance. In a third example, an acceleration card is installed in a system whose main processor is of a different processing architecture. Code that does memory management operations may be seamlessly moved between the main processor and the acceleration card, for improving performance.

At least some embodiments describe herein address the above mentioned technical problem(s) and/or improve the above mentioned technical field(s), and/or improve upon prior approaches, by one or more of (in the case where the first processor allocated the memory and the second processor issues a request to release the allocated memory):

Sending a message from the second processor to the first processor. The first processor releases the allocated memory based on the message from the second processor.

Converting a format of a code segment that deallocates memory, from a format of the first processor to a format of the second processor. The second processor executes the converted code segment for releasing the region of the pool of the memory.

The second processor marks a garbage-collection data structure with an indication of the allocated region of the memory. The first processor removes the allocated memory as indicated by the marking.

The first processor updates a state data structure for indicating the allocation. The second processor updates the same state data structure for indicating the release.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
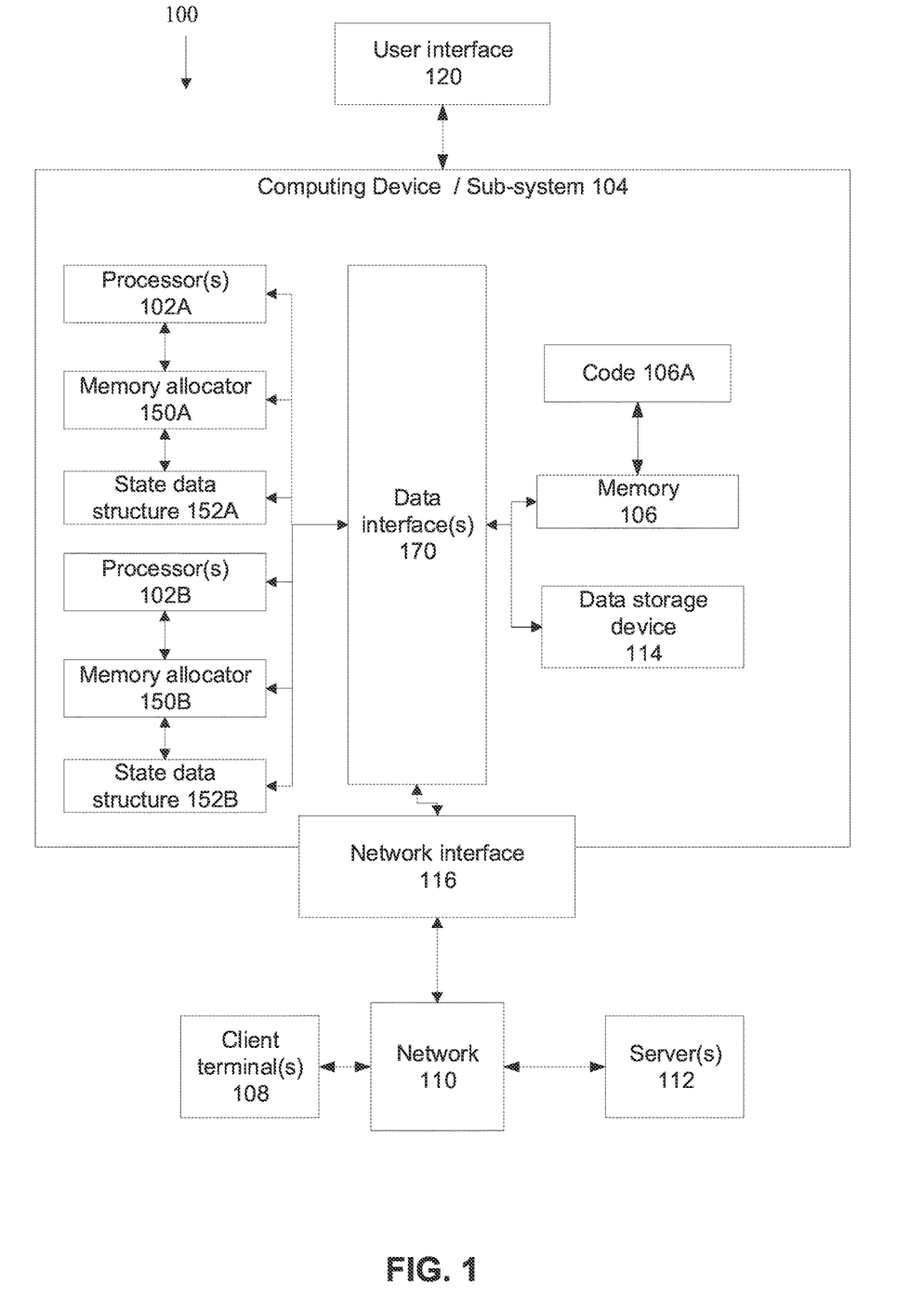
FIG. 1 is a block diagram of components of a system for allocation of a memory, use of the allocated memory, and/or release of the allocated memory by multiple processors, in accordance with some embodiments of the present invention.
Figure 2:
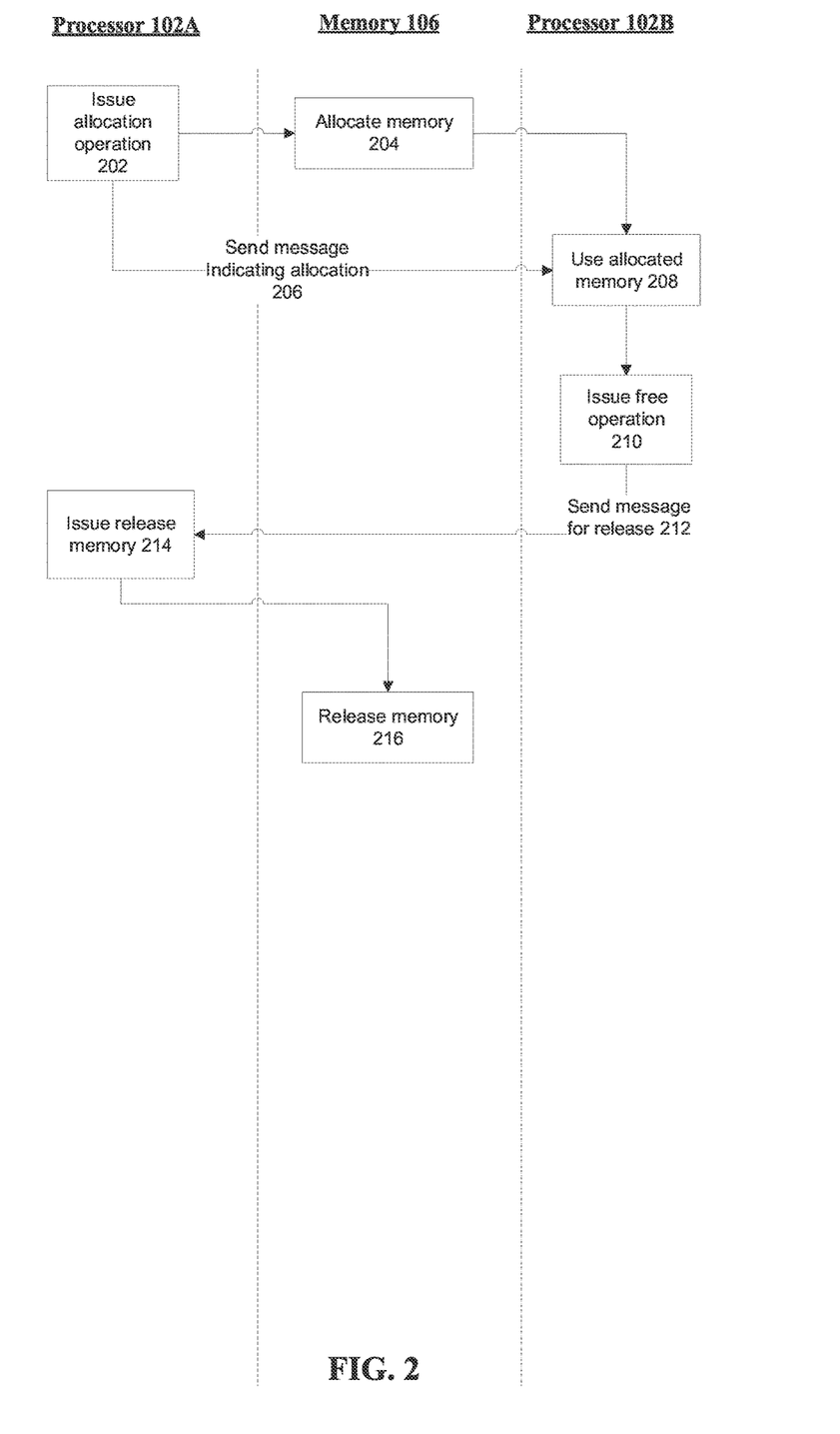
FIG. 2, which is a dataflow diagram of a process for allocation of a memory, use of the allocated memory, and/or release of the allocated memory by multiple processors, in accordance with some embodiments of the present invention.
Figure 3:
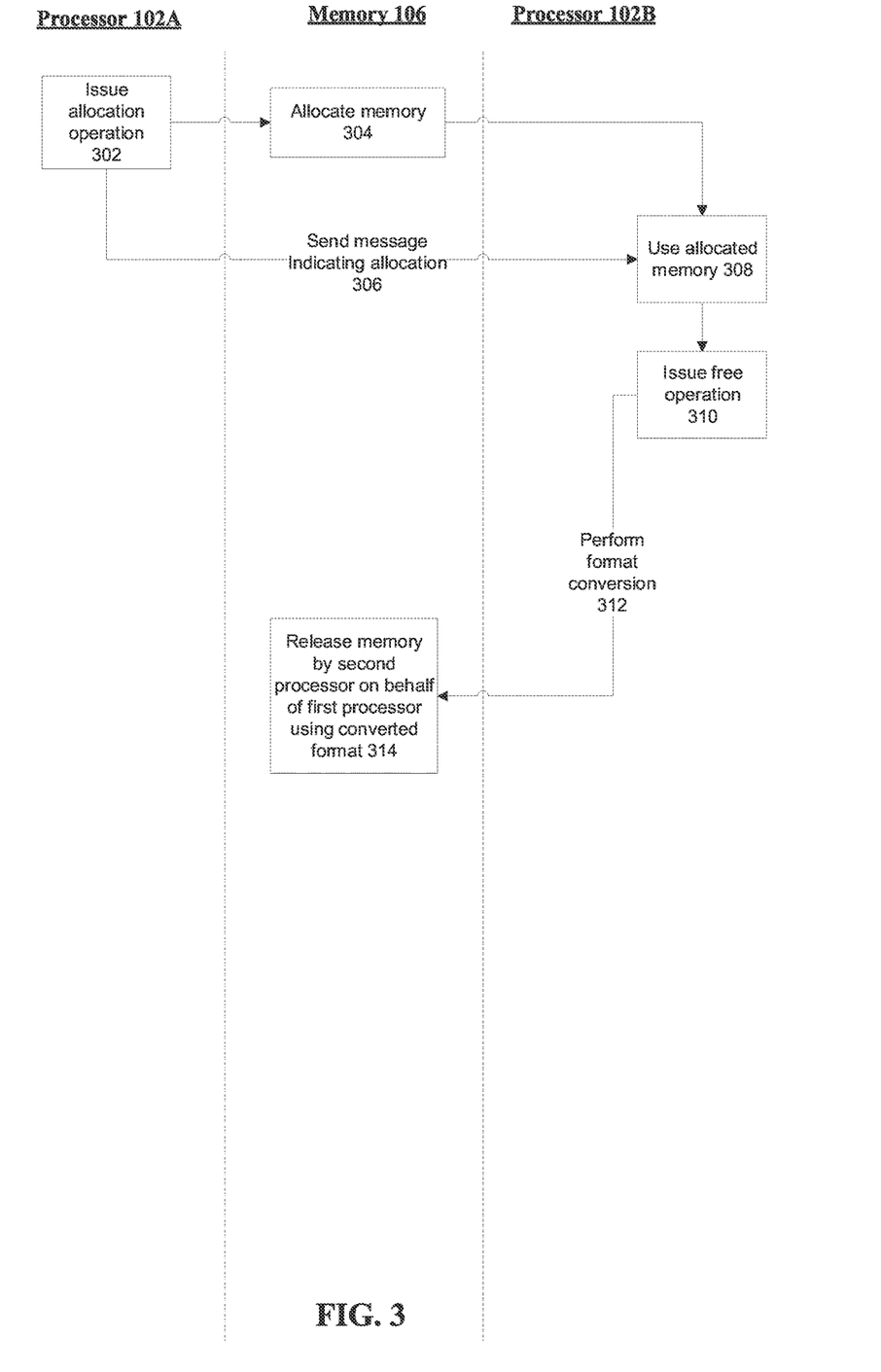
FIG. 3 is another dataflow diagram of a process for allocation of a memory, use of the allocated memory, and/or release of the allocated memory by multiple processors, in accordance with some embodiments of the present invention.
Figure 4:
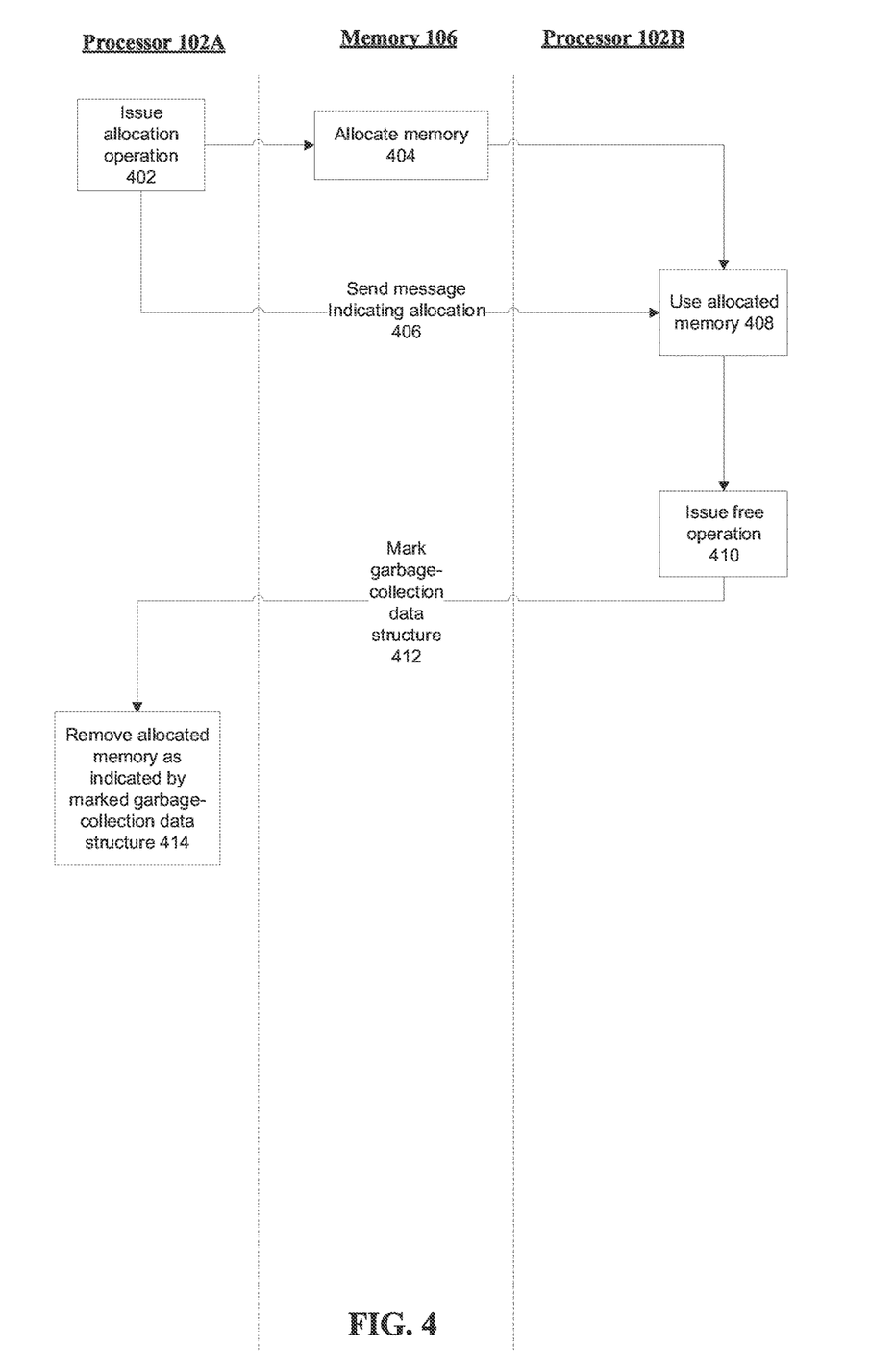
FIG. 4 is yet another dataflow diagram of a process for allocation of a memory, use of the allocated memory, and/or release of the allocated memory by multiple processors, in accordance with some embodiments of the present invention.
Figure 5:
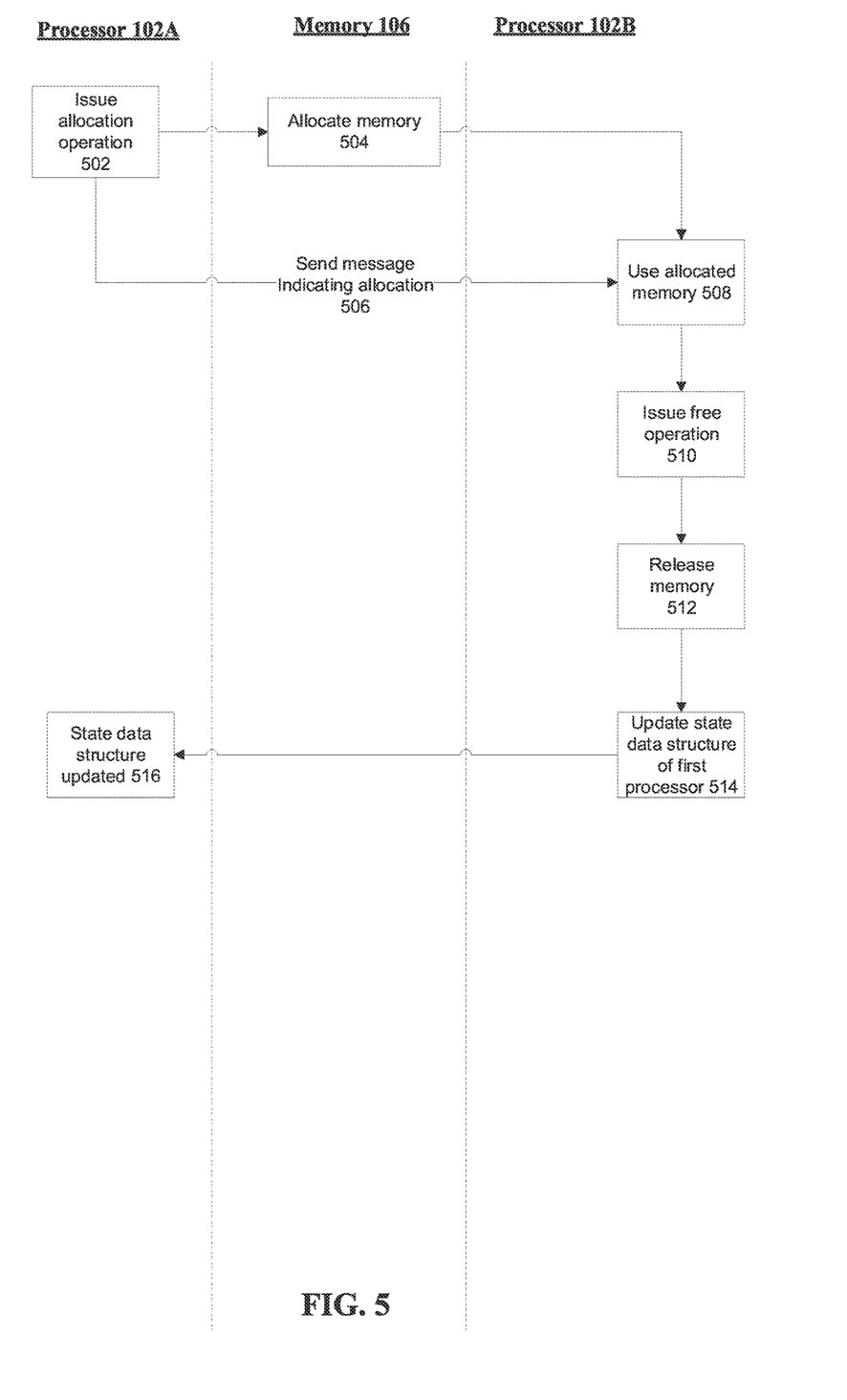
FIG. 5 is yet another dataflow diagram of a process for allocation of a memory, use of the allocated memory, and/or release of the allocated memory by multiple processors, in accordance with some embodiments of the present invention.

Reference is now made to FIG. 1, which is a block diagram of components of a system 100 for allocation of a memory 106, use of the allocated memory, and/or release of the allocated memory by multiple processors 102A-B, in accordance with some embodiments of the present invention. Reference is also made to FIG. 2, which is a dataflow diagram of a process for allocation of a memory, use of the allocated memory, and/or release of the allocated memory by multiple processors, in accordance with some embodiments of the present invention. Reference is also made to FIG. 3, which is another dataflow diagram of a process for allocation of a memory, use of the allocated memory, and/or release of the allocated memory by multiple processors, in accordance with some embodiments of the present invention. Reference is also made to FIG. 4, which is yet another dataflow diagram of a process for allocation of a memory, use of the allocated memory, and/or release of the allocated memory by multiple processors, in accordance with some embodiments of the present invention. Reference is also made to FIG. 5, which is yet another dataflow diagram of a process for allocation of a memory, use of the allocated memory, and/or release of the allocated memory by multiple processors, in accordance with some embodiments of the present invention.

It is noted that different embodiments described herein, for example, with reference to FIGS. 2-5, may be implemented for example, depending on the designer of the system and/or other advantages and/or constraints that are imposed externally. For example, a system designer that happens to be working on a system with exceptional high-bandwidth messaging/RPC capabilities might opt for one implementation, while someone who holds an efficient garbage collection algorithm might opt for another implementation.

Two processors 102A-B are shown as a simple example. However, it is to be understood that embodiments described herein may be implemented by three or more processors.

Features described with reference to FIGS. 2-5 may be implemented in software, as code instructions executed by processors 102A-B.

Processors 102A-B may be heterogeneous, of two or more different kinds of architectures. At least some embodiments described herein enable heterogeneous processors to allocate memory, use the allocated memory, and/or release the allocated memory, where the allocation, the user, and the release, is of the same region of memory. Alternatively or additionally, processors 102A-B may be homogeneous processors, of the same kind of architecture.

Processor(s) 102A-B may be implemented based on a data-flow architecture, i.e., an architecture designed for data-flow. Alternatively or additionally, processor(s) 102A-B may be implemented based on non-data flow architectures (i.e., an architecture that is not designed for dataflow, for example, central processing unit (CPU), graphics processing unit (GPU), data processing unit (DPU), field programmable gate array (FPGA), coarse-grained reconfigurable arrays (CGRA), Quantum computer, and the like. Processor(s) 102A-B may be implemented as a customized and/or specialized processor, for example, to perform signal processing, network routing, graphics, and telemetry. Processor(s) 102A-B may be implemented as, for example, a CPU, a GPU, FPGA, digital signal processor(s) (DSP), and application specific integrated circuit(s) (ASIC). Processor(s) 102A-B may include a single processor, or multiple processors (homogeneous or heterogeneous) arranged for parallel processing, as clusters and/or as one or more multi core processing devices, for example, each processor 102A or 102B may represent a group/cluster of processors.

A region of memory 106 is allocated, as described herein. The allocated memory region is accessible from code running on any of processors 102A-B, regardless of the memory the allocated region resides on. The access to the allocated region of the memory 106 from code running on any of processors 102A-B is for implementations described herein, for example, with reference to FIGS. 2-5. The implementations described herein (e.g., with reference to FIGS. 2-5) may differ in memory access patterns, for example, some implementations require access to allocator data structures on another processor's memory, in order to perform the management operations of allocation and deallocation on its behalf, and some don't. However the implementations described herein (e.g., with reference to FIGS. 2-5) allow access to the allocated memory region itself. Processors 102A-B may communicate with one another and/or with memory 106 via one or more data interfaces 170, for example, a local bus within a computer, and/or a network interface where the processors 102A-B are installed within different computers. Data interface 170 may be implemented and/or include a shared memory bus, for example, PCIe, which allows memory 106 to be accessed from any one of processors 102A-B.

Optionally, each processor 102A-B is associated with a respective memory allocator 105A-B. Memory allocators 150A-B may be implemented as hard-wired circuitry, optionally as an integrated circuit, and/or in software and/or firmware. Memory allocators 150A-B may be integrated within respective processor(s) 102A-B, and/or in communication with processor(s) 102A-B.

Processor(s) 102A-B and/or memory allocator(s) access and/or update a respective state data structure 152A-B indicating a state of allocation of a pool of the memory 106, allocates regions of the pool of memory 106, and/or releases the allocated regions of the pool of memory 106, as described herein.

Memory may be implemented as non-volatile memory, for example, a random access memory (RAM), GPU graphical memory, high-bandwidth memory, dynamic random access memory (DRAM) and/or storage class memory (SCM). Memory 106 may store code 106A for execution by processor(s) 102A-B that requests the memory allocation, uses the allocated memory, releases the allocated memory, and/or implements other features such as sending messages between processors 102A-B, as described herein.

Processor(s) 102A-B, and/or memory allocator(s) 150A-B, and/or state data structure(s) 152A-B, and/or memory 106 may be located within a single computing device and/or within a sub-system 104 which may include multiple computing devices in communication with one another.

Computing device and/or sub-system 104 may be implemented as, for example, one or more and/or a combination of: a group of connected devices, a high performance computer (HPC), a network node (e.g., router, bridge), a client terminal, a server, a virtual server, a computing cloud, a virtual machine, a desktop computer, a thin client, and/or a mobile device (e.g., a Smartphone, a Tablet computer, a laptop computer, a wearable computer, glasses computer, and a watch computer).

Computing device and/or sub-system 104 may include a data storage device 114 for storing data, for example, programs, applications and/or processes that when loaded into memory 106 and are executed by processor(s) 102A-B request allocation of memory 106, use the allocated memory, and/or free the allocated memory. Data storage device 114 may be implemented as, for example, a memory, a local hard-drive, a virtual storage, a removable storage unit, an optical disk, a storage device, and/or as a remote server and/or computing cloud (e.g., accessed using a network connection).

Computing device and/or sub-system 104 may be remotely accessed for allocation of memory 106, for use of the allocated memory, and/or for freeing the allocated memory, by one or more remote processors installed within devices over network 110 via a network interface 116, for example, from server(s) 112 and/or client terminal(s) 108 and/or other devices that include processors such as sensors, internet of things (IoT) devices, drones, autonomous vehicles, robots, and the like.

Processor(s) 102A-B may communicate with remotely located processors installed on client terminal(s) 108 and/or server(s) 112 via one or more network interfaces 116.

Network interface 116 may be implemented as, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Processor(s) 102A-B may communicate with one another and/or with remotely located processors installed on client terminal(s) 108 and/or server(s) 112 over a network 110, via data interface 170 and/or network interface 116.

Network 110 may be implemented as, for example, the internet, a local area network, a virtual network, a wireless network, a cellular network, a local bus, a point to point link (e.g., wired), and/or combinations of the aforementioned.

Computing device and/or sub-system 104 includes and/or is in communication with one or more physical user interfaces 120 that include a mechanism for a user to enter data and/or view data. Exemplary user interfaces 120 include, for example, one or more of, a touchscreen, a display, a virtual reality display (e.g., headset), gesture activation devices, a keyboard, a mouse, and voice activated software using speakers and microphone.

Referring now back to FIG. 2, the dataflow diagram depicts dataflow between processor 102A, sometimes referred to herein as a first processor, and a second processor 102B, sometimes referred to herein as a second processor, with respect to memory 106 that is being allocated, used, and/or released. Processors 102A-B and/or memory 106 are as described with reference to FIG. 1. It is noted that two processors 102A-B are depicted for clarity and simplicity of explanation. As used herein the description of two processors 102A-B not meant to be necessarily limited to two processors. Three or more processors may be implemented, for example, where a third or more processors use the memory that is allocated by the first processor and released by the second processor.

Optionally, processor 102A-B are heterogeneous processors, of different architectural types. Processor 102A may be of one type of architecture and processor 102B may be of a different type of architecture that is different from the architecture type of processor 102A. For example, processor 102A is of a data-flow processing architecture, and processor 102B is of a non-data-flow processing architecture. In another example, processor 102A is of a non-data-flow processing architecture, and processor 102B is of a data-flow processing architecture. In yet another example, both processors 102A and 102B are of a non-data-flow processing architecture.

Exemplary non-data-flow processing architectures include: CPU, GPU, DPU, FPGA, CGRA, Quantum computer, and the like.

Data-flow may refer to a computer programming paradigm that models at least part of a software program as a directed graph of data flowing between operations such that a series of operations is applied to each data element in a sequence of data elements.

Alternatively processors 102A-B are homogenous processors, of the same architecture.

Processors 102A-B access the same region of the pool of memory 106. I.e., the region of the pool of memory 106 allocated by a process executed on the first processor and released by a second process executed on the second processor is the same region of memory.

Code maps a first pool of the memory for use by the first processor and a second pool of the memory for use by the second processor, and for allocation by the first memory allocator and the second memory allocator, in distinct memory locations. The code may be executed, for example, by the first processor, the second processor, and/or by another processor.

Optionally, each respective processor is associated with its own respective memory allocator. For example, processor 102A is associated with memory allocator 150A, and processor 102B is associated with memory allocator 150B.

Optionally, one or more of: (i) the allocation of the region of the memory, (ii) deallocation of the region of memory, and (iii) the release of the allocation of the region of the memory, are performed in a single atomic operation. The single atomic operation includes one or more, optionally all, of the following feature: reading a state data structure indicating a state of allocation of the pool, checking the state data structure for a condition, updating the data structure according to an outcome of the check, and returning an address of the allocated region of the memory in response to a request for allocation of the memory.

The single atomic operation prevents another processor from accessing the same state data structure at the same time, for example, as described with reference to 514 of FIG. 5, where the second processor accesses and updates the state data structure used by the first processor, and/or as described with reference to 314 of FIG. 3 where the second processor releases memory on behalf of the first processor using the format converted instructions.

Additional exemplary details of the single atomic operation are described with reference to U.S. patent application Ser. No. 17/885,654, entitled "HARDWARE-ACCELERATED MEMORY ALLOCATION", by at least one common Inventor as Inventors of the instant application, which is co-filed with the instant application, and incorporated herein by reference in its entirety.

At 202, an allocation operation for allocation of a region of a pool of memory 106 is issued (e.g., requested). The allocation operation is issued on processor 102A, optionally by a process being executed by processor 102A.

At 204, memory 106 is allocated according to the issued allocation operation. The allocation may be performed by a memory allocated associated with processor 102A.

Optionally, the allocated memory is migrated from the processor 102A to processor 102B.

At 206, a message is sent to processor 102B indicating the allocation of the region of the pool of the memory. It is noted that alternatively or additionally, the message may be sent to another processor, different from processors 102A-B, for example, a third processor.

The message may be, for example, a pointer to the location of the allocated memory, enabling processor 102B to access the allocated region of memory 106.

At 208, the memory allocated by processor 102A may be used. The allocated memory may be used by processor 102B, and/or by another processor, for example, a third processor. The third processor may be of yet another different type of architecture that is different from the architectures of processor 102A and/or processor 102B.

At 210, the processor 102B issues a free operation for release of the allocated region of the pool of the memory. The free operation may be issued by a process executed on processor 102B. It is noted that even in the case of the allocated memory being used by the third processor, the second processor may still issue the free operation to release the allocated memory.

When the allocated memory is migrated to processor 102B, the free operation is for release of the migrated memory.

Optionally, the first process that generates the allocation operation and the second process that generates the free operation are different instances of the same set of code. For example, one instance of a program is loaded and executed by the first processor, and another instance of the same program is loaded and executed by the second processor. The different instances of the same program, running on the two different processors, may perform the allocation and release of the memory.

Optionally, a single instance of the different instances is executed at any given time. The first process may be a first instance of the code executed by the first processor that generates the allocation operation, and the second process is a second instance of the code executed by the second processor that generates the free operation. For example, when the first instance of the program is executed on processor 102A and issues the memory allocation operation, the second instance of the program loaded on processor 102B is not being executed. When the second instance of the program is executed on processor 102B and issues the operation to free the allocated memory, the first instance of the program is not executed by processor 102A.

The different instances of the same code (e.g., program) may flow into and flow out of the different processors.

At 212, the second processor sends a message to the first processor. The message is for triggering the release of the allocated memory by the first processor, which performed the original allocation.

Optionally, the first processor sends a message to the second processor for updating a first state data structure for indicating the release of the memory. Such features may be implemented when the first processor and the second processor are each associated with their own respective state data structures. The first data structure is non-accessible by the second processor and the second data structure is non-accessible by the first processor. The first processor updates the first data structure for indicating the issued allocation operation in 202. The second processor updates the second data structure for indicating the free operation issued in 210. In response to the issuance of the free operation, the second processor sends a message to the first processor for updating the first state data structure for indicating the release.

Optionally, in the implementation where the second memory allocator of the second processor is of a different type than the first memory allocator, in response to the free operation issued by the second memory allocator, code instructs the first memory allocator to release the memory indicated by the free operation. The message may be sent by the code. The code may be executed by the second processor.

The message may be sent asynchronously. No completion message is necessarily triggered in response to the message. Operations that follow the free operation are non-blocked by the message. Other messages sent between processors as described may be sent asynchronously.

At 214, processor 102A issues a request for releasing the allocated memory (which it allocated in 202) according to the message.

The first state data structure may be updated for indicating the release.

Code (e.g., executed by the first processor, the second processor, and/or another processor) may instruct the first memory allocator of the first processor to release the memory according to a memory address of the released memory. The code may mark the released memory for deletion on a first memory pool of the first processor. The code may map the released memory for deletion on the second pool of the second processor.

The released memory may be marked for deletion, for example, by a queue associated with the first allocator that allocated the released memory.

The code may generate a message for sending to the second processor, the message indicating the mapping of the released memory for deletion on the first memory pool to the second pool of the second processor.

At 216, the allocated memory is released according to the request.

The allocated memory may be released, for example, by the first and/or the second processor executing a garbage collection code for monitoring for released memory marked for deletion, that frees the released memory upon detecting the marking.

Referring now back to FIG. 3, features described with reference to 302-310 correspond to features described with reference to 202-210 of FIG. 2.

At 312, the format of a code segment that deallocates the memory is converted, from a format of the first processor to a format of the second processor. The conversion may be done, for example, by the second processor, by the first processor, and/or by another processor.

The code segment may be translated, for example, when an architecture type of the first processor is different from the architecture type of the second processor.

The conversion may be performed, for example, by a binary translation approach, which allows running code meant for a specific architecture on a different architecture.

At 314, the second process executes the converted code segment. The converted code segment executed by the second processor releases the region of the pool of the memory allocated by the first processor as indicated in the free operation.

The second processor running the converted code segment may access a data structure managed by the first processor, for updating the state data structure to indicate the release of the allocated region of the pool of the memory.

Referring now back to FIG. 4, features described with reference to 402-410 correspond to features described with reference to 202-210 of FIG. 2.

At 412, the second processor marks a garbage-collection data structure with an indication of the allocated region of the pool of the memory as indicated in the free operation. The garbage-collection data structure is accessible to the first processor and the second processor.

At 414, the first processor reads the marking on the garbage-collection data structure. For example, the first processor may executed a period garbage collection routine that periodically reads markings on the garbage-collection data structure, and/or a message indicating that the garbage-collection data structure has a new marker for being read may be sent to the first processor (e.g., by the second processor, by another processor, by the garbage-collection data structure).

The first processor removes the allocated region of the pool of the memory as indicated by the marking on the garbage-collection data structure, thereby freeing up the allocated region of the memory.

Referring now back to FIG. 5, features described with reference to 502-510 correspond to features described with reference to 202-210 of FIG. 2.

At 512, the second processor releases the allocated memory according to the free operation.

At 514, the second processor updates a state data structure for indicating the release of the allocated memory.

At 516, the state data structure that is updated by the second processor is also accessible and updateable by the first processor. By reading the state data structure, the first processor is aware of the state of the regions of the memory, and is aware of the memory released by the second processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processors will be developed and the scope of the term processor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of allocation of memory, comprising:
    issuing an allocation operation for allocation of a region of a pool of a memory by a first process executed on a first processor;
    sending a message to a second processor indicating the allocation of the region of the pool of the memory,
    wherein the first processor and the second processor access the region of the pool of the memory;
    issuing a free operation for release of the allocated region of the pool of the memory by a second process executed on a second processor; and
    releasing, by the first processor, the allocated region of the pool of the memory as indicated in the free operation,
    wherein the region of the pool of the memory allocated by the first process executed on the first processor and released by the second process executed on the second processor is a same region of memory,
    wherein the first processor and the second processor are of a plurality of heterogeneous processors, wherein the first processor is of a first type of architecture and the second processor is of a second type of architecture that is different from the first type of architecture type of the first processor,
    wherein the first processor further comprises a first memory allocator and the second processor further comprises a second memory allocator,
    wherein the first memory allocator is of a different type than the second memory allocator.

2. The computer implemented method of claim 1, one of:
(i) wherein the first type of architecture comprises a data-flow processing architecture, and the second type of architecture comprises a non-data-flow processing architecture, and (ii) wherein the first type of architecture comprises a non-data-flow processing architecture, and the second type of architecture comprises a data-flow processing architecture.

3. The computer implemented method of claim 1, wherein a message is sent to the first processor from the second processor for triggering the releasing by the first processor.

4. The computer implemented method of claim 1, wherein issuing the free operation for release of the allocated region of the memory comprises:
    marking, by the second processor, a garbage-collection data structure with an indication of the allocated region of the pool of the memory as indicated in the free operation; and
    removing, by the first processor, the allocated region of the pool of the memory as indicated by the marking on the garbage-collection data structure.

5. The computer implemented method of claim 1, further comprising:
    updating by the first processor a first state data structure for indicating the allocation,
    updating by the second processor a second state data structure for indicating the release,
    wherein the first state data structure is different from the second state data structure, wherein the first state data structure is non-accessible by the second processor and the second state data structure is non-accessible by the first processor, and
    in response to the free operation, sending a message to the first processor for updating the first state data structure for indicating the release.

6. The computer implemented method of claim 1, wherein at least one of (i) the allocation of the region of the memory, (ii) deallocation of the region of memory, and (iii) the release of the allocation of the region of the memory, is performed in a single atomic operation.

7. The computer implemented method of claim 6, wherein the single atomic operation comprises:
    reading a state data structure indicating a state of allocation of the pool,
    checking the state data structure for a condition,
    updating the state data structure according to an outcome of the check, and
    returning an address of the allocated region of the memory in response to a request for allocation of the memory.

8. The computer implemented method of claim 1, wherein the first process that generates the allocation operation and the second process that generates the free operation are a plurality of different instances of a same set of code.

9. The computer implemented method of claim 8, wherein a single instance of the plurality of different instances is executed at any given time, wherein the first process comprises a first instance of the code executed by the first processor that generates the allocation operation and the second process comprises a second instance of the code executed by the second processor that generates the free operation.

10. The computer implemented method of claim 1, further comprising migrating the allocated memory from the first processor to the second processor, wherein the free operation generated by the second process is for release of the migrated allocated memory.

11. The computer implemented method of claim 1, further comprising:
a third processor that uses the allocated region of memory allocated by the first processor.

12. The computer implemented method of claim 11, wherein the third processor is of a third type of architecture that is different from a second type of architecture of the second processor and different from a first type of architecture of the first processor.

13. The computer implemented method of claim 1, further comprising:
a code that maps a first pool of the memory for use by the first processor and a second pool of the memory for use by the second processor, and for allocation by the first memory allocator and the second memory allocator, in distinct memory locations.

14. The computer implemented method of claim 13, further comprising a code that in response to the free operation issued by the second memory allocator, instructs the first memory allocator to release the memory indicated by the free operation.

15. The computer implemented method of claim 14, wherein the code instructs the first memory allocator to release the memory according to a memory address of the released memory, marks the released memory for deletion on a first memory pool of the first processor and maps the released memory for deletion on the second pool of the second processor.

16. The computer implemented method of claim 14, wherein the released memory is marked for deletion by a queue associated with the first allocator that allocated the released memory.

17. The computer implemented method of claim 14, wherein the second processor executes a garbage collection code for monitoring for released memory marked for deletion, and frees the released memory.

18. The computer implemented method of claim 14, wherein the code generates a message for sending to the second processor, the message indicating the mapping of the released memory for deletion on the first memory pool to the second pool of the second processor.

19. The computer implemented method of claim 18, wherein the message is sent asynchronously, wherein no completion message is triggered in response to the message, wherein operations follow the free operation are non-blocked by the message.

20. A computer implemented method of allocation of memory, comprising:
issuing an allocation operation for allocation of a region of a pool of a memory by a first process executed on a first processor;
sending a message to a second processor indicating the allocation of the region of the pool of the memory;
issuing a free operation for release of the allocated region of the pool of the memory by a second process executed on a second processor,
wherein the first processor and second processor access the same memory;
converting format of a code segment that deallocates memory, from a format of the first processor to a format of the second processor; and
running the converted code segment by the second processor for releasing the region of the pool of the memory allocated by the first processor as indicated in the free operation
wherein the first processor and the second processor are of a plurality of heterogeneous processors, wherein the first processor is of a first type of architecture and the second processor is of a second type of architecture that is different from the first type of architecture type of the first processor,
wherein the first processor further comprises a first memory allocator and the second processor further comprises a second memory allocator,
wherein the first memory allocator is of a different type than the second memory allocator.

21. The computer implemented method of claim 20, wherein converting format comprises translating the code segment, wherein the code segment is translated when an architecture type of the first processor is different from an architecture type of a second processor.

22. The computer implemented method of claim 20, wherein the second processor running the converted code segment accesses a state data structure managed by the first processor for updating the state data structure to indicate the release of the allocated region of the pool of the memory.

23. A computer implemented method of allocation of memory, comprising:
issuing an allocation operation for allocation of a region of a pool of a memory by a first process executed on a first processor;
sending a message to a second processor indicating the allocation of the region of the pool of the memory,
wherein the first processor and the second processor access the region of the pool of the memory;
issuing a free operation for release of the allocated region of the pool of the memory by a second process executed on a second processor;
marking, by the second processor, a garbage-collection data structure with an indication of the allocated region of the pool of the memory as indicated in the free operation; and
removing, by the first processor, the allocated region of the pool of the memory as indicated by the marking on the garbage-collection data structure,
wherein the first processor and the second processor are of a plurality of heterogeneous processors, wherein the first processor is of a first type of architecture and the second processor is of a second type of architecture that is different from the first type of architecture type of the first processor,
wherein the first processor further comprises a first memory allocator and the second processor further comprises a second memory allocator,
wherein the first memory allocator is of a different type than the second memory allocator.

24. A computer implemented method of allocation of memory, comprising:
issuing an allocation operation for allocation of a region of a pool of a memory by a first process executed on a first processor;
updating by the first processor, a state data structure for indicating the allocation;
sending a message to a second processor indicating the allocation of the region of the pool of the memory;
wherein the first processor and the second processor access the region of the pool of the memory;
issuing a free operation for release of the allocated region of the pool of the memory by a second process executed on a second processor;
releasing the allocated region of the pool of the memory by the second processor according to the free operation; and updating by the second processor, the state data structure for indicating the release, wherein the same state structure is accessible and updated by the first processor and the second processor, wherein the region of the pool of the memory allocated by the first process executed on the first processor and released by the second process executed on the second processor is a same region of memory, wherein the first processor and the second processor are of a plurality of heterogeneous processors, wherein the first processor is of a first type of architecture and the second processor is of a second type of architecture that is different from the first type of architecture type of the first processor, wherein the first processor further comprises a first memory allocator and the second processor further comprises a second memory allocator, wherein the first memory allocator is of a different type than the second memory allocator.

* * * * *